United States Patent [19]

Tani

[11] Patent Number: 4,972,266

[45] Date of Patent: Nov. 20, 1990

[54] ELECTRIC STILL CAMERA

[75] Inventor: Nobuhiro Tani, Tokyo, Japan

[73] Assignee: Asahi Kogaku Kogyo Kabushiki Kaisha, Tokyo, Japan

[21] Appl. No.: 489,779

[22] Filed: Mar. 5, 1990

Related U.S. Application Data

[63] Continuation of Ser. No. 371,659, Sep. 25, 1989, abandoned, which is a continuation of Ser. No. 248,389, Sep. 23, 1988, abandoned.

[30] Foreign Application Priority Data

Sep. 25, 1987 [JP] Japan .................................. 62-241547

[51] Int. Cl.⁵ .............................................. H04N 3/14
[52] U.S. Cl. .......................... 358/213.19; 358/213.16; 358/167; 358/228; 358/909
[58] Field of Search .............. 358/213.19, 228, 213.13, 358/213.15, 213.16, 209, 163, 167, 909

[56] References Cited

U.S. PATENT DOCUMENTS

| 4,675,738 | 6/1987 | Okino et al. | 358/213.16 |
| 4,754,333 | 12/1985 | Nara | 358/213.19 |
| 4,760,452 | 2/1987 | Kaneko et al. | 358/213.19 |
| 4,763,196 | 6/1987 | Sakai | 358/213.19 |

Primary Examiner—Stephen Brinich
Attorney, Agent, or Firm—Sandler, Greenblum & Bernstein

[57] ABSTRACT

An electronic still camera incorporating a base clip circuit for clipping an image signal at a base level. In order to eliminate a reduction in the S/N ratio of the image signal attributable to an increase in the dark current level in pixel signal, the clipping level of the base clip circuit is variable in accordance with, for example, the shutter speed.

10 Claims, 3 Drawing Sheets

ELECTRIC STILL CAMERA

This application is a continuation of application Ser. No. 07/371,659, filed Sept. 25, 1989, abandoned, which is a continuation of Ser. No. 248,389, filed Sept. 23, 1988, abandoned.

BACKGROUND OF THE INVENTION

1. Field of the Invention

The present invention relates to an electronic still camera and, more particularly, to an electronic still camera having a base clip circuit with variable operation characteristics.

2. Description of the Prior Art

In general, electronic still cameras suffer from a common drawback in that the dark current component in a pixel signal from each pixel of an imaging device increases as the charge storage time, i.e., the shutter opening time, increases, with the result that the dynamic range of the pixel signal is undesirably restricted. The noise caused by the dispersion of dark current in each pixel is increased as the charge storage time increases, so that the S/N ratio is disadvantageously reduced.

Electronic still cameras usually incorporate base clip circuits for clipping image signals at base level. Such base clip circuits, however, are not designed to allow their clipping characteristics to be varied. Namely, the clipping characteristics of these base a clip circuits are kept constant, regardless of a change in the dark current level. Thus, the known electronic cameras with such base clip circuits can not eliminate the reduction in the S/N ratio attributable to a change in the dark current level.

SUMMARY OF THE INVENTION

An object of the present invention is to provide an electronic still camera which is capable of improving the operating characteristics of a base clip circuit in accordance with the level of dark a current component so as to maintain a high S/N ratio.

According to the present invention, there is provided an electronic still camera comprising a photometric means capable of measuring the brightness of an object to be photographed; shutter a speed setting means for setting a shutter speed in accordance with the photometric value outputted from the photometric means; base a clip circuit means for receiving both an image signal and a control signal and capable which is of suppressing low-amplitude components of the image signal over a range corresponding to the level of the control signal; and control circuit means for producing the control signal, the level of which varies according to the shutter speed the control circuit means delivering the control signal to the base clip circuit, thereby widening the range as the shutter speed becomes lower.

A lower shutter speed, i.e., a longer shutter opening time, causes the dark current level in the pixel signal to be raised and the dispersion of dark current in each pixel signal to be increased, which tends to reduce the S/N ratio. According to the present invention, the range over which the low-amplitude components in the image signal are suppressed is widened as the shutter speed decreases, i.e., as the dark current level is increased. As a result, the noise reduction effect is enhanced so as to improve the S/N ratio of the image signal.

The above and other objects, features and advantages of the present invention will become clear from the following description of a preferred embodiment when the same is read in conjunction with the accompanying drawings.

DESCRIPTION OF THE PREFERRED EMBODIMENT

A preferred embodiment of the present invention will be described with reference to the accompanying drawings.

Figure 1:
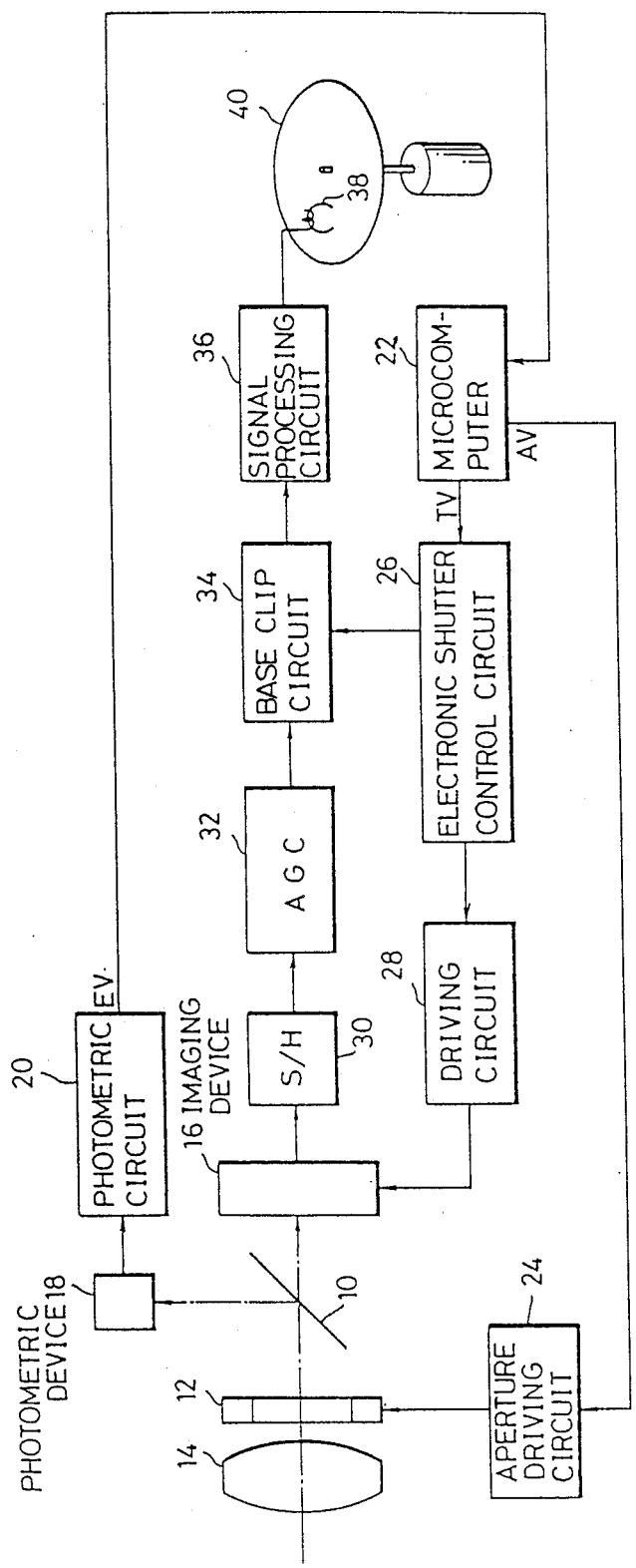
FIG. 1 is a block diagram showing essential portions of an electronic still camera embodying the present invention.

FIG. 1 shows an essential portion of an electronic still camera in accordance with the present invention. A photographing lens 14 is disposed at a light-incident side of a diaphragm or aperture 12 which is disposed on the light-incident side of a half mirror 10. An imaging device 16 is disposed behind the half mirror 10. The half mirror 10 is inclined at an angle of approximately 45° to the axis of the photographing lens 14. The light from a photographing object (not shown) impinges upon the half mirror 10 through the photographing lens 14 and the aperture 12 and is split by the half mirror 10 into two portions, one of which penetrates the half mirror 10 so as to form an image on the light-receiving surface of the imaging device 16 while the other converges on a photometry device 18, which converts this portion of light into an electric signal. The electric signal obtained through this photoelectric conversion is further converted into an EV value signal by a photometric circuit 20. The EV value signal is supplied to a microcomputer 22.

Upon receipt of the EV value signal, the microcomputer 22 operates to determine an aperture value AV and shutter speed TV from the received EV value in accordance with a so-called program AE method.

The microcomputer 22 controls the aperture opening of the aperture 12 through a driving circuit 24, in accordance with determined the AV value. The shutter speed signal TV thus obtained is delivered to an electronic shutter control circuit 26. The electronic shutter control circuit 26 drives the imaging device 16 through a driving circuit 28, so as to allow electrostatic charges obtained through the photoelectric conversion to be accummulated and stored over the period corresponding to the shutter speed signal TV. The microcomputer 22 then delivers successive pixel signals from the imaging device 16 to a signal processing circuit 36 through a sample and hold circuit 30, AGC circuit 32 and base clip circuit 34. The signal processing circuit 36 forms a composite color image signal and conducts FM modulation of the composite color image signal. The modulated composite color image signal is delivered to a magnetic head 38. The magnetic head 38 records composite color information carried by the composite color image signals corresponding to one picture frame in a predetermined track of a magnetic disk 40. The electronic shutter control circuit 26 operates in accordance with the shutter speed signal TV from the microcomputer 22 to deliver a control signal to the base clip circuit 34 so as to optimally set the level of the bias current in the base clip circuit 34 for attaining a high S/N ratio.

Figure 2:
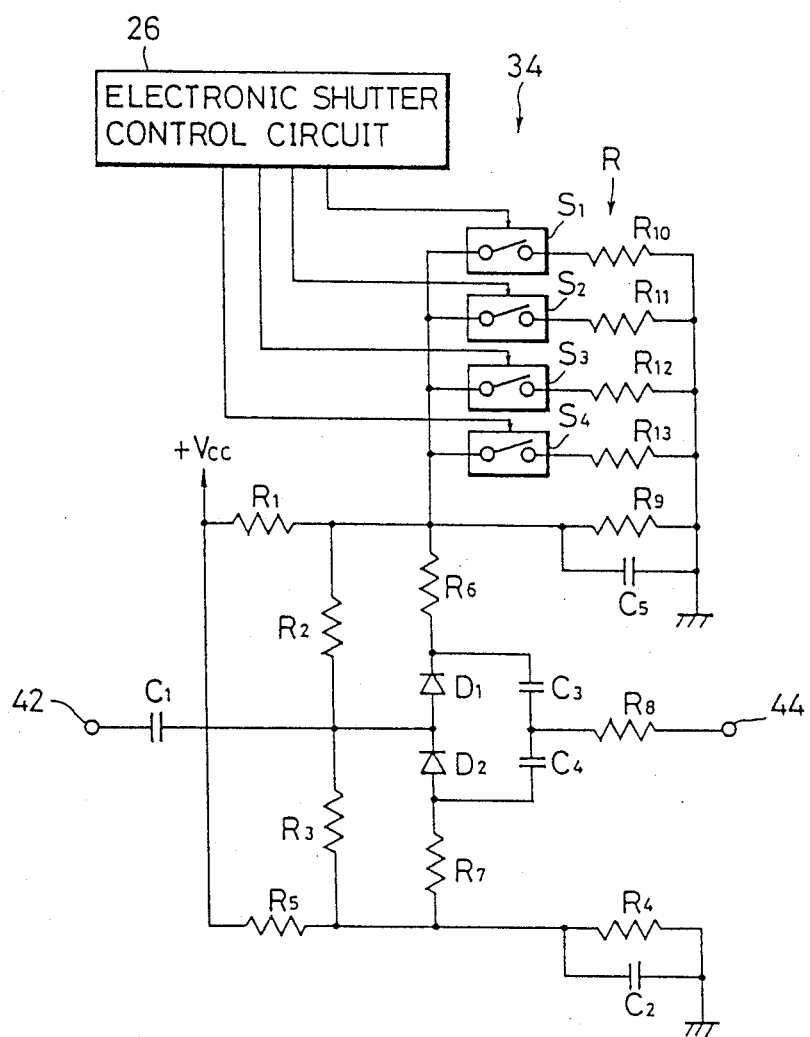
FIG. 2 is a circuit diagram showing a practical example of a base clip circuit incorporated in the electronic still camera of FIG. 1.

FIG. 2 shows the detail of the base clip circuit 34. The base clip circuit 34 comprises an input terminal 42, an output terminal 44, resistors $R_1$ to $R_{13}$, capacitors $C_1$ to $C_5$, diodes $D_1$, $D_2$, and analog switches $S_1$ to $S_4$.

Resistors $R_{10}$ to $R_{13}$ are connected in series with respective analog switches $S_1$ to $S_4$. Therefore, combined resistance R formed between both terminals of the resistor $R_9$ by the resistors $R_1$ to $R_{13}$ varies, depending on the combination of states of the respective analog switches $S_1$ to $S_4$. This causes a change in the level of the bias current which flows from the power supply terminal +Vcc through the resistors $R_5$, $R_7$, diodes $D_2$, $D_1$, resistor $R_6$ and the combined resistance R.

On the other hand, the A.C. component of image the signal input to the inputted terminal 42 passes through the capacitor $C_1$. If the A.C. components are positive, a forward current corresponding to the positive component flows to the output terminal through the diode $D_1$, capacitor $C_3$ and resistor $R_8$, whereas, when the A.C. component is negative, a backward current is obtained at the output terminal 44 through the diode $D_2$, capacitor $C_4$ and resistor $R_8$.

When the value of the combined resistor R is increased, the level of the bias current is decreased so that the range over which the amplitude components (noise components) of the input signal is suppressed is widened by the voltage/current characteristics of the diodes $D_1$ and $D_2$.

The states of the analog switches $S_1$ to $S_4$ are determined as follows: all the switches $S_1$ to $S_4$ are closed when the shutter speed is not lower than 1/60 second. When the shutter speed is 1/30 second, analog switch $S_1$ is opened. When the shutter speed is 1/15 second analog switches $S_1$ and $S_2$ are opened. At a shutter speed of ⅛ second, only analog switch $S_4$ is closed. All the analog switches $S_1$ to $S_4$ are opened when the shutter speed is ¼ second.

Figure 3:
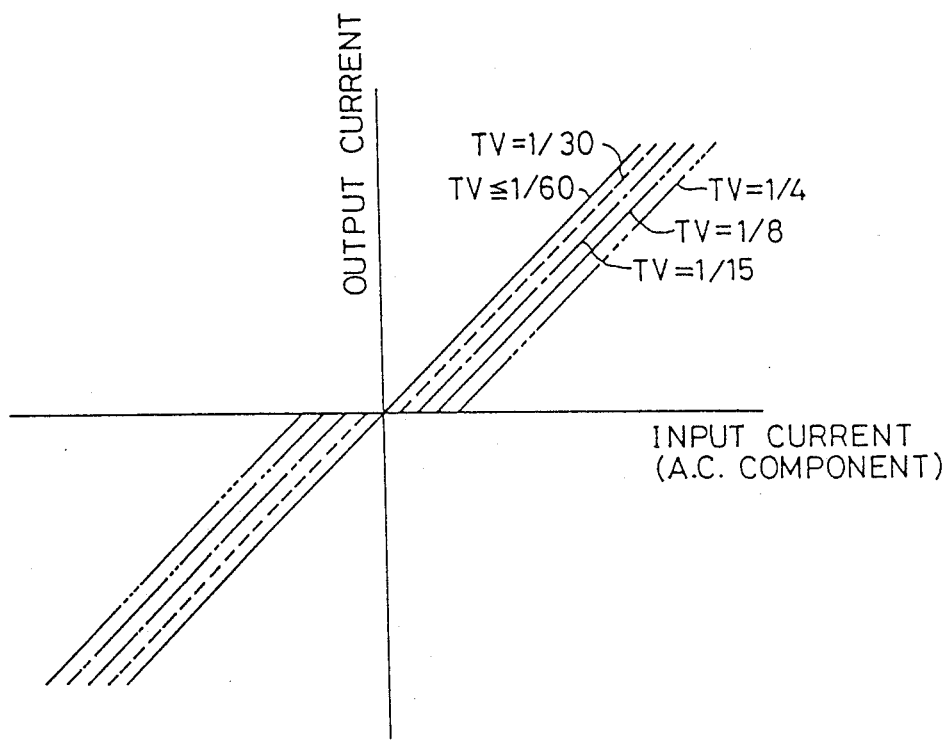
FIG. 3 is a diagram showing input/output characteristics of the base clip circuit shown in FIG. 2.

FIG. 3 illustrates the input/output characteristics of the base clip circuit 34, exhibited by the base clip circuit 34 having the described construction.

The dark current component and the noise caused by the dispersion of dark current in each pixel signal increases as the shutter speed becomes lower, i.e., as the charge storage time on the imaging device 16 becomes longer, with the result that the dynamic range of the pixel signal is narrowed and the S/N ratio is reduced.

According to the invention, however, the reduction of the S/N ratio is well compensated for and a high S/N ratio through the whole system is obtainable by virtue of the fact that the range of suppression of low-amplitude components becomes wider as the storage time increases. In the described embodiment, the bias current in the base clip circuit 34 is changed in a non-linear, or stepped manner, through selection of combination of resistors which are connected in parallel. This, however, is not exclusive and the arrangement may be such that the bias current is linearly changed by, for example, selective use of resistors which are connected in series or by varying a resistance value of a voltage control resistance circuit which makes use of a FET (Field Effect Transistor).

It should also be noted that, when the non-linear change of the bias current is adopted, the bias current may be changed over two, three, four or more stages or six or more stages, although the described embodiment is constructed to enable the bias current to be varied over five stages.

Other changes and modifications are possible without departing from the scope of the invention.

What is claimed is:

1. An electronic still camera comprising:
   photometric means capable of measuring the brightness of an object to be photographed;
   means for setting a shutter speed in accordance with a photometric value output from said photometric means;
   base clip circuit means for receiving both an image signal and control signal for suppressing low-amplitude components of said image signal over a range corresponding to the level of said control signal; and
   control circuit means for producing said control signal, the level of which varies according to said shutter speed, said control circuit means delivering said control signal to said base clip circuit means to widen said range as said shutter speed becomes lower.

2. An electronic still camera according to claim 1, wherein said base clip circuit comprises:
   a first capacitor having a first end and a second end, said first end being connected to an image signal input terminal of said base clip circuit;
   a first diode having an anode and a cathode, said anode being connected to said second end of said first capacitor;
   a second diode having an anode and a cathode, said cathode being connected to said second end of said first capacitor;
   a second capacitor having a first end and a second end, said first end being connected to said cathode of said first diode;
   a third capacitor having a first end and a second end, said first end being connected to said anode of said second diode;
   a resistor having one end connected to said second ends of said second and third capacitors, the remaining end of said resistor being connected to an output terminal of said base clip circuit; and
   means for supplying a D.C. voltage between said cathode of said first diode and said anode of said second diode, corresponding to said control signal for supplying a D.C. bias current through said first and second diodes.

3. An electronic still camera according to claim 2, wherein said means for supplying said D.C. voltage includes means for dropping a supplied voltage through a resistor means the value of said resistor means being varied in response to said control circuit means so as to vary said D.C. voltage between said cathode of said first diode and said anode of said second diode.

4. An electronic still camera according to claim 3, wherein said means for dropping said supplied voltage through said resistor means includes:
   a plurality of switches, each switch having one terminal commonly connected to each other; and
   said resistor means comprising a plurality of resistors having one end connected to second terminals of said plurality of switches, the remaining ends of said resistors being commonly connected together;
   wherein said control circuit means is capable of varying the combinations of states of said switches so as to vary the resistance of said resistor means.

5. An electronic still camera comprising:

means for setting a shutter speed;

base clip circuit means for receiving both an image signal and a control signal and for varying a range of suppressing low-amplitude components of said image signal based upon said control signal; and control circuit means for producing said control signal based upon said shutter speed, said control circuit means delivering said control signal to said base clip circuit means to widen said range as said shutter speed becomes lower.

6. An electronic still camera according to claim 5, wherein said base clip circuit comprises:

a first capacitor having a first end and a second end, said first end being connected to an image signal input terminal of said base clip circuit;

a first diode having an anode and a cathode, said anode being connected to said second end of said first capacitor;

a second diode having an anode and a cathode, said cathode being connected to said second end of said first capacitor; and a second capacitor having a first end and a second end, said first end being connected to said cathode of said first diode;

a third capacitor having a first end and a second end, said first end being connected to said anode of said second diode;

a resistor having one end connected to said second ends of said second and third capacitors, the remaining end of said resistor being connected to an output terminal of said base clip circuit; and means for supplying a D.C. voltage between said cathode of said first diode and said anode of said second diode, corresponding to said control signal for supplying a DC bias current through said first and second diodes.

7. An electronic still camera according to claim 6, wherein said means for supplying said D.C. voltage includes means for dropping a supply voltage through a resistor means, the value of said resistor means being varied in response to said control circuit means so as to vary said D.C. voltage between said cathode of said first diode and said anode of said second diode.

8. An electronic still camera according to claim 7, wherein said means for dropping said supply voltage through said resistor means includes:

a plurality of switches, each switch having one terminal commonly connected to each other; and said resistor means comprising a plurality of resistors having one end connected to second terminals of said plurality of switches, the remaining ends of said resistors being commonly connected together; and wherein said control circuit means is capable of varying the combination of states of said switches so as to vary the resistance of said resistor means.

9. An electronic still camera according to claim 5, said camera further including a photometric means capable of measuring the brightness of an object to be photographed and of outputting a photometric value; and said means for setting a shutter speed is controlled in accordance with a photometric value output from said photometric means.

10. An electronic still camera comprising:

means for setting a shutter speed;

base clip circuit means for receiving both an image signal and a control signal, said base clip circuit means being capable of suppressing low-amplitude components of said image signal over a range corresponding to the level of said control signal; and control circuit means for producing said control signal, the level of which varies according to said shutter speed, said control circuit means delivering said control signal to said base clip circuit means to widen said range as said shutter speed becomes lower.

* * * * *